United States Patent
Dhawan (10) Patent No.: US 8,635,553 B2
(45) Date of Patent: Jan. 21, 2014

(54) AUTO ADJUSTABLE PANE VIEW (75) Inventor: Anuj Dhawan, Noida (IN)

(73) Assignee: Adobe Systems Incorporated, San Jose, CA (US)

(*) Notice: Subject to any disclaimer, the term of this patent is extended or adjusted under 35 U.S.C. 154(b) by 2066 days.

(21) Appl. No.: 11/357,806

(22) Filed: Feb. 16, 2006

(65) Prior Publication Data
US 2013/0125049 A1    May 16, 2013

(51) Int. Cl.
G06F 3/048    (2013.01)
(52) U.S. Cl.
USPC ............ 715/800; 715/788; 715/793; 715/790
(58) Field of Classification Search
USPC .................................. 715/800, 788, 793, 790
See application file for complete search history.

(56) References Cited

U.S. PATENT DOCUMENTS

| | | | |
|---|---|---|---|
| 6,252,607 B1* | 6/2001 | Babcock | 345/468 |
| 6,823,494 B2* | 11/2004 | Minoura et al. | 715/800 |
| 6,832,355 B1 | 12/2004 | Duperrouzel et al. | |
| 6,874,128 B1 | 3/2005 | Moore et al. | |
| 6,981,223 B2 | 12/2005 | Becker et al. | |
| 2002/0054123 A1 | 5/2002 | Walden et al. | |
| 2005/0235223 A1 | 10/2005 | Arend et al. | |
| 2005/0235224 A1 | 10/2005 | Arend et al. | |
| 2005/0246640 A1 | 11/2005 | Lacy | |
| 2006/0031761 A1* | 2/2006 | Ohta | 715/517 |
| 2006/0253796 A1* | 11/2006 | Wang et al. | 715/788 |
| 2007/0101289 A1* | 5/2007 | Awada et al. | 715/784 |

* cited by examiner

*Primary Examiner* — Robert Stevens
*Assistant Examiner* — Daniel Um
(74) *Attorney, Agent, or Firm* — Wolfe-SBMC (57) ABSTRACT

Techniques for an auto adjustable pane view are described, including receiving a request to display a plurality of elements in a pane, the pane located in a display space, determining a number and a size of the a plurality of elements, and sizing the pane based on the number of the plurality of elements and the size of the plurality of elements, wherein the sizing is also based on minimizing unused space in the pane.

8 Claims, 8 Drawing Sheets

AUTO ADJUSTABLE PANE VIEW

FIELD OF THE INVENTION

The present invention relates generally to software. More specifically, auto adjustable pane view is described.

BACKGROUND OF THE INVENTION

Many software products today handle multiple media types. Some examples of different media types may include image files, graphics files, moving image files, movie files, word processing files, text files, web log (blog) files, voice recordings, music files, Portable Document Format (PDF) files, bitmap files, Joint Photographic Experts Gorup (JPEG) files, Graphic Interchange Format (GIF) files, JPEG Interchange format (JIF) files, recipe files, and the like. Many users prefer the use of images or graphic representation of files over the previous use of textual representation. Some examples of image based or graphic representation of media file may include thumbnails, tiles, or icons. Each representation may offer differing levels of information detail and size.

Applications are faced with the challenge of how to display a folder of these media file representations. For example, some applications divide the display window into two portions, panels, panes, or windows. The first portion displays a location of the media files and the second portion displays the media file representations in the selected location. In another example, hyper text markup language (HTML) 4.0 makes use of frames. Frames allow a web designer to divide the web screen into related sections. For example, one frame may contain a table of contents, a folder hierarchy, or a site map, and one or more additional frames may contain the content associated with the elements in the table of contents, the folder hierarchy, or the site map.

Many applications that use frames, or that divide a display screen, may preset the size of the sections. The display screen can be referred to by a plurality of names, some examples of which include display, screen, page, window, space, or any combination of them. The window sections may be referred to as frames, panes, portions, windows, panels, or other similar names. One example may be to arbitrarily preset the size of a left-side frame or panel displaying a table of contents to be the height of the display window and approximately ⅓ the width of the display window, and to preset the size of a right-side frame to be the height of the display window and approximately ⅔ the width of the display window to display the content selected in the left-side frame. However, this approach may leave a portion of display space unused. For example, the table of contents or folder hierarchy may not utilize the entire length of the panel or frame. That is, there may not be enough content in the table of contents, site map, or folder structure to consume the preset space of a panel or frame, leaving a portion of the frame unused. Further, as a user makes selections in an application, the table of contents, folder structure or site map may change reducing or increasing the space required. However, a panel with a preset size cannot adjust to these changing requirements and thus has to be pre-sized with enough space to accommodate the largest of content.

Thus, what is needed is a solution for displaying multiple panels, frames or window portions without the limitations of conventional techniques.

BRIEF DESCRIPTION OF THE DRAWINGS

Various embodiments of the invention are disclosed in the following detailed description and the accompanying drawings.

DETAILED DESCRIPTION

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, the steps of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

In some embodiments, a method for sizing a pane in a window may include, receiving a request to display a plurality of elements in a pane, determining a number of elements and a size of items to be displayed, sizing a pane based on the number of the plurality of elements, on the size of the plurality of elements, wherein the sizing is also based on minimizing unused space in the pane. In some elements, sizing may refer to the process of determining the size of pane space used to display elements. A system may include a first pane having substantially similar space to a display window, a second pane covering a portion of the first pane space, and a sizing processor configured to size the second pane based on content and configured to adjust a first pane drawing space based on the size of the second pane. In some embodiments, a method of displaying a first and second pane may include sizing a first pane to display a plurality of items, wherein the plurality of item are displayed based on an item height of the plurality of items and on an item width of the plurality of items, setting a location of the first pane in a display space, and allocating unused drawing space (i.e., drawing space not used to display items in the first pane) to a second pane.

Figure 1:
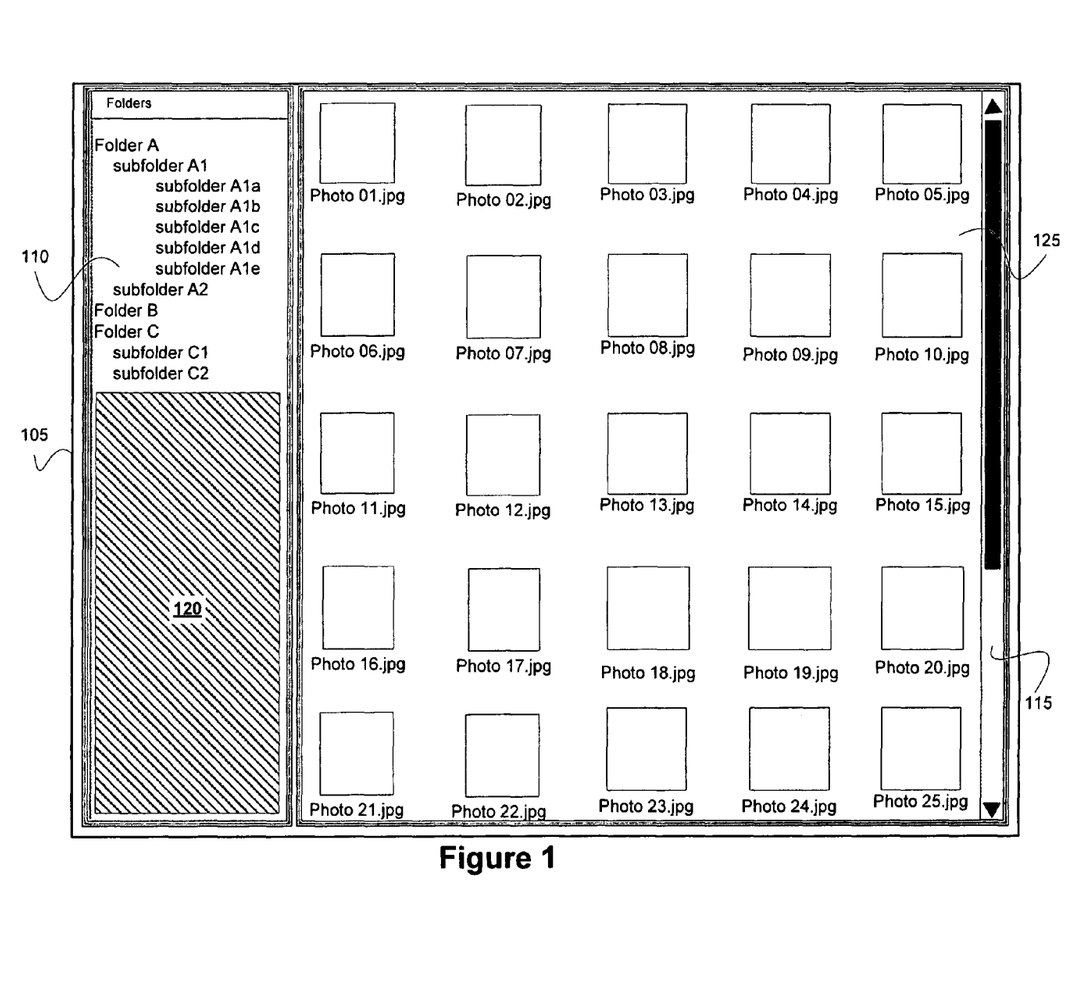
FIG. 1 illustrates an exemplary display window including panels of preset size.

FIG. 1 illustrates an exemplary display window including panels of preset size. Display window 105 may include frame 110 and frame 125. Frame 110 may include a folder structure, while frame 125 may include one or more image files or media files (e.g., audio, video, text, images, photos, and other content), of which a representation of a portion of these files may be visible. In general, content may refer to items or elements such as files or file structural elements to be displayed. There may be insufficient space in frame 125 to display a complete set of desired content (e.g., media files). Scroll bar 115 may be used to shift the position of the content within the display area. In some embodiments, a scroll bar may include a slide bar and a pointer. In other embodiments, a scroll bar may include different graphical user interface functionality and be implemented differently than shown and described. Here, the slide bar may be used to shift the position of content displayed in frame 125. The pointer may be configured to slide along the slide bar to determine the position of the content that is being displayed in the display area. That is, the content to be displayed may use a certain amount of space. However, the display frame may be limited to less space than the content uses for display. Thus, a scroll bar may be utilized to determine the portion of the content that may be viewable in the display area. A scroll bar may be referred to as a window control element. Alternatively, the folder structure in frame 110 may possess insufficient content to consume the space available in frame 110. Consequently, frame 110 may have an area of unused space 120 that may be re-allocated to frame 125.

Figure 2:
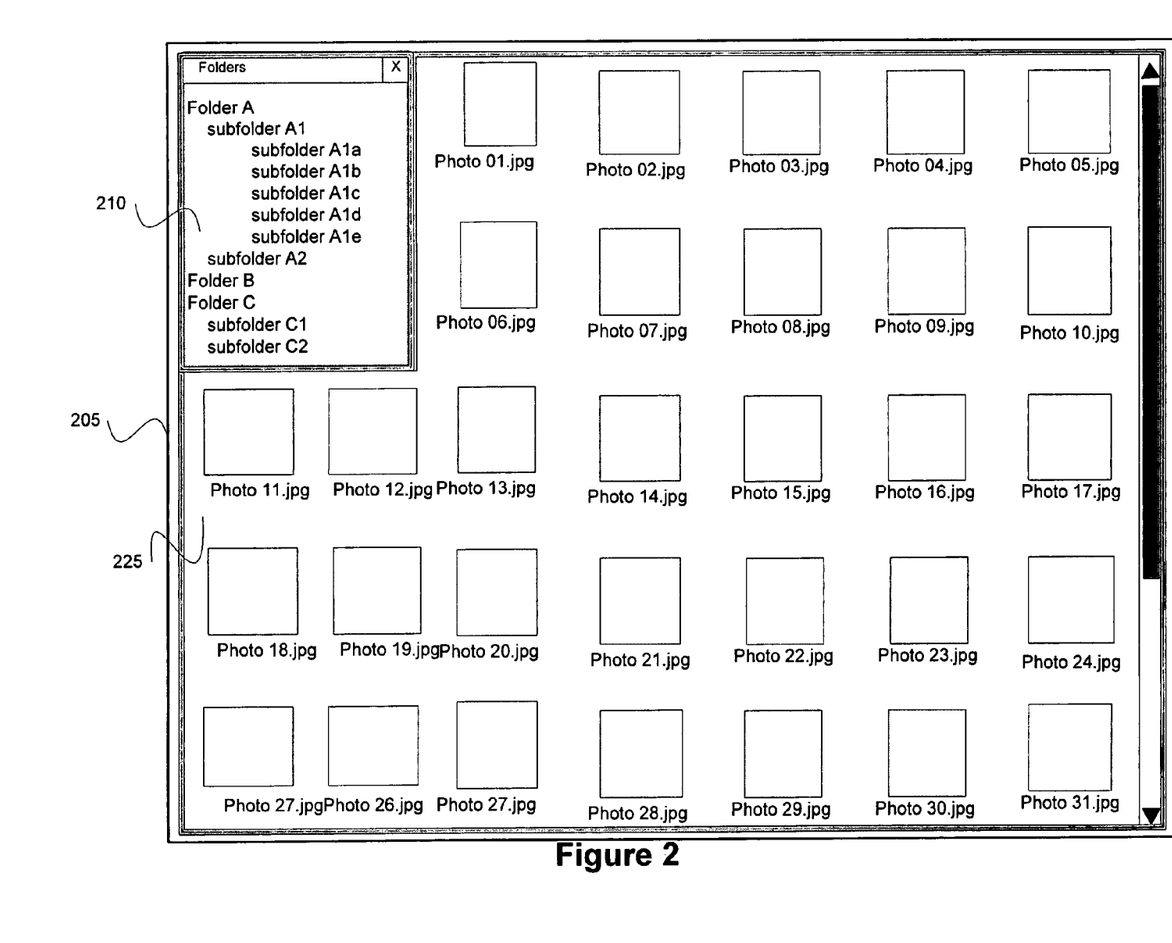
FIG. 2 illustrates an exemplary display window including adjustable size panes.

FIG. 2 illustrates an exemplary display window including auto adjustable size panes. Display window 205 may include panes 210 and 225. Pane 210 may be sized proportionally to the folder structure content. That is, pane 210 possesses sufficient space to accommodate the folder structure content without possessing extra space that remains unused. Pane 225 may utilize the remainder of the display window space. That is, the display window space not consumed by pane 210 may be used by pane 225. Pane 225 may be resized to include the unused display window space in pane 210. Pane 225 in FIG. 2 may display a larger number of media files representations than frame 125 in FIG. 1.

Figure 3:
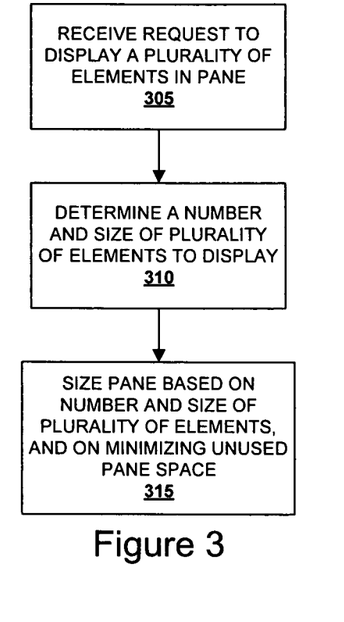
FIG. 3 illustrates an exemplary process for sizing an adjustable pane.

FIG. 3 illustrates an exemplary process for automatically sizing an adjustable pane. Process action 305, may receive a request to display a plurality of items or elements in a pane. In some embodiments, a request may be a message, command, or other input (e.g., user, system, default-specified, or other) that, when received, initiates or triggers a responsive action, message, command, action, or data to be sent. Here, a request may be provided to display an item or element. In some embodiments, items or elements may refer to entities such as folders or web pages within a folder hierarchy, a folder structure, a table of contents, or similar structural entity. In some embodiments, a request may be received by selecting a navigational element, such as a folder structure element (e.g., a "folder" icon), such that the new folder contents may be displayed. In some embodiments, a request may be received by opening a file management application, such as a digital image management application. In other embodiments, a request may be received by selecting a hyperlink to display a web page. The web page may possess a window with navigational elements such as a site map and another window with a plurality of media files (e.g., audio, video, text, images, graphics, or other content. Process action 310 may automatically determine the number of items or elements to be displayed and the size of the items or elements to be displayed. In some embodiments, these values may be stored with the items or elements. Process action 315 may automatically size a pane based on the number of the plurality of elements, on the size of the plurality of elements, and on minimizing unused pane space. In other words, the pane may be sized proportionally such that it possesses enough space to accommodate the plurality of items or elements without possessing extra space that remains unused.

For example, a display window may be sized 600 pixels long by 800 pixels wide. A pane may need to display 12 elements, each having a height of 20 pixels and a width of 250 pixels. The dimensions of pane 110 in FIG. 1 may be arbitrarily set to the height of the window, 600 pixels. The dimensions of an adjustable pane are not arbitrarily set, but may alternatively be automatically calculated based on the content to be displayed (e.g., folder hierarchy, site map, table of contents, or other display elements). Content may also refer to the media files located within the folder hierarchy, site map, table of contents or other display elements. In general, content may refer to the items or elements being displayed. The height of the adjustable pane may be calculated by multiplying the number of elements by the height of the elements, or (12*20) 240 pixels. The width of the adjustable pane may be calculated by matching the width of the elements, or 250 pixels. A pane with dimensions of 240×250 pixels may be created, such as pane 210 in FIG. 2, whereas frame 110 in FIG. 1 may have dimensions 600×250 pixels. In this example, the difference in size between frame 110 and pane 210 is a rectangle having dimensions of 360×250 pixels.

In some embodiments, the sizing calculations may have default spacing parameters that may be set to add a number of pixels to the overall height or width, or to the height and/or width of each element. For example, a sizing pane may need to display 12 elements each having a height of 15 pixels and a width of 225 pixels. The spacing parameter may be set to add 5 pixels to the height and 25 pixels to the width of each element such that the dimensions of the pane may be calculated as 12*20, or a height of 240 pixels and a width of (225+25) 250 pixels. In this example, absolute values were used for the spacing parameters, however, in some embodiments, spacing parameters may also be set by percentage. Other spacing parameters may set margins from the top, bottom, left, and right, edges of the pane.

Figure 4:
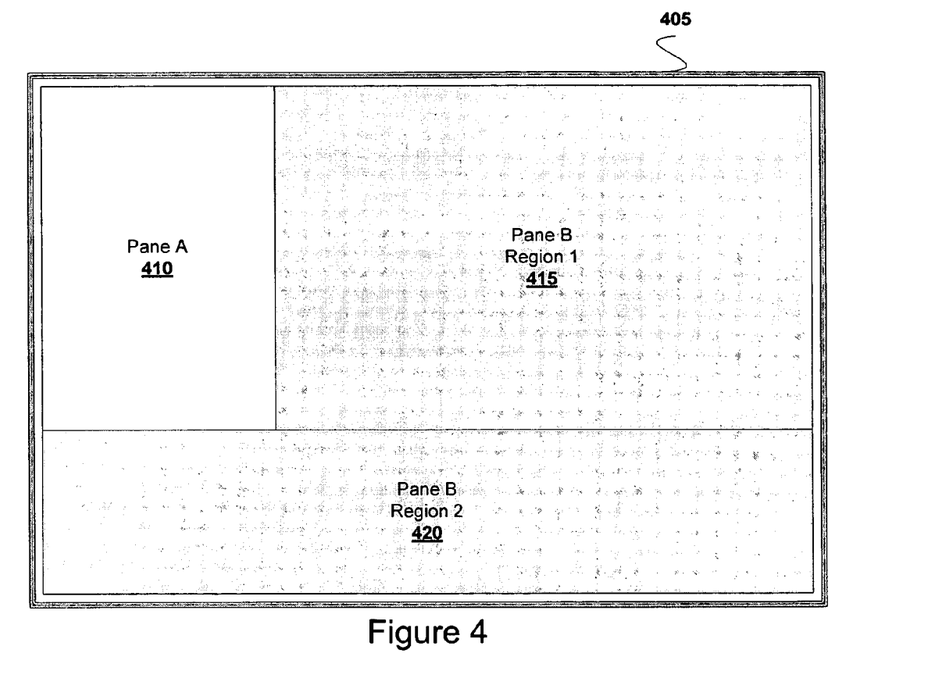
FIG. 4 illustrates an exemplary display window included a second pane with two regions.

Some embodiments for sizing panes may be configured to divide the second pane into two regions. FIG. 4 illustrates an exemplary display window including a second pane with two regions. Display window 405 may include 2 panes. Pane A 410 may be illustrated as a single region on the left of display window 405. Pane A 410 may be used to display a file structure, table of contents, or similar structural navigational entity. Region 1 of pane B 415 may be shown on the right hand side of the display window 405. Region 2 of pane B 420 may be shown along the bottom of display window 405. Although the regions of pane B are shown as distinct entities, they act together when drawing elements for display. Regions 1 and 2 of pane B may be used to display media files (e.g., audio, video, text, images, graphics, and other content). In some embodiments, a gap may be introduced between the two regions during the drawing process. That is, the calculations for drawing media files for the two regions may result in an inconsistent spacing between the media file representations in region 1 closest to the boundary, and the media file representations in region 2 closest to the boundary. The inconsistent spacing may be balanced in the drawing process.

Although this or other illustrations may show space between the drawing window 405 and the panes, or show space between panes A and B, this is for illustration purposes only. In some implementations, there may be no space between the display window and the panes; that is, the pane edge and the display window edge, or pane A edge and pane B edge, may abut, touch, or share a common edge. In still other implementations, spacing between drawing window 405 and panes A and B may be described differently.

Figure 5A:
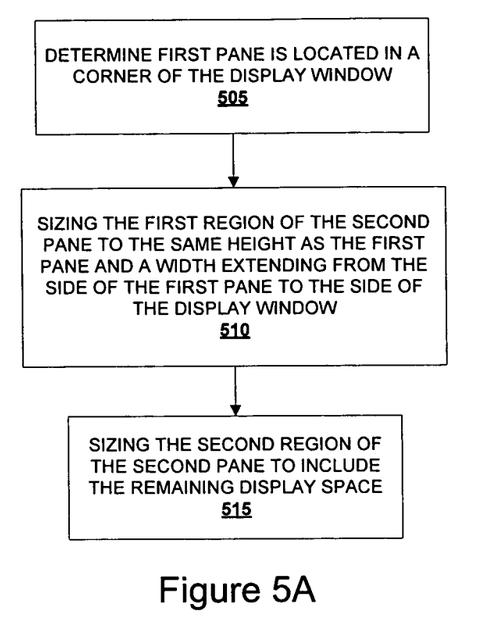
FIG. 5A illustrates an exemplary process for sizing a second pane with two regions.

FIG. 5A illustrates an exemplary process for sizing a second pane with two regions. The location of pane A in a corner may be determined in process action 505. In some embodiments, pane A may not be located in a corner, but may be located at another location in the display window, such as the top, bottom, left-side, right-side, or other window location. Pane B may track the location information and the dimension information of pane A. The location determination may be based on the tracked information. In process action 510 the first region of pane B may be created. The first region of pane B may be created by creating a pane with a height equal to that of the first pane and a width extending from the edge of the first pane to the edge of the display window, such as element 415 in FIG. 4. In process action 515, the second region of pane B may be created. The second region of pane B may be created by creating a pane to include the remaining display space. That is, the second region of pane B may have a width equal to the width of the display window, and a height extending from the edge of pane A to the edge of the display window such as element 420 in FIG. 4.

Figure 5B:
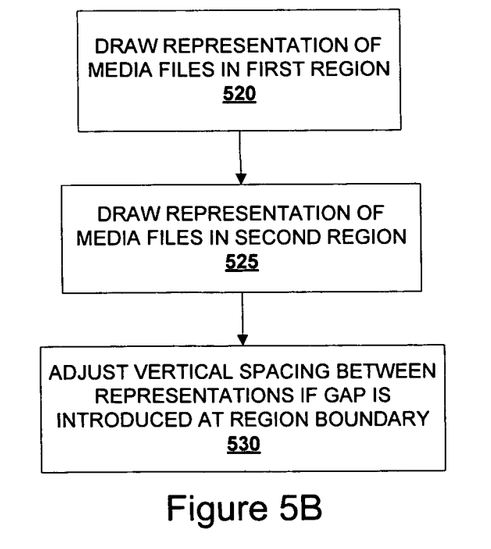
FIG. 5B illustrates an exemplary process for drawing representations of media files in a pane with two regions.

FIG. 5B illustrates an exemplary process for drawing representations of media files in a pane with two regions. Drawing representations of media files may refer to displaying representations of media files. Pane B may be utilized to draw or display representations of media files. Some example representations of media files may include thumbnails, tiles, icons, or text. In some embodiments, a specific representation such as a thumbnail may be associated with a specific media file and used as the representation of the media file. For example, a thumbnail, may on a smaller scale, reflect the image of the stored digital image file which it represents. That is, a thumbnail representation may be a miniature copy of the digital image it represents. In other embodiments, the representation may indicate the file type of the media file. For example, a document file may be represented by an icon corresponding to the brand or application used to create the media file, or the company that created the application. In process action 520, representations of media files may be displayed or drawn in the first region of pane B. The media representations may be drawn such that no representation is shown partially, that is whole representations are displayed or drawn. In process action 525, representations of media files may be drawn or displayed in the second region of pane B. In some embodiments, a gap may be introduced between the first region and the second region. In process action 530, the vertical spacing between the two regions may be adjusted to remove the gap.

The following example compares the media file drawing techniques described above in connection with FIG. 1 and FIG. 2. In a display window of 600×800 pixels a frame 110 may have dimensions 600×250. Frame 125 may have dimensions 600×550. Using thumbnails to represent media file with dimensions of height of 120 pixels and a width of 110 pixels, frame 2 may display 550÷110 or 5 thumbnails in each row and 600÷120, or 5 thumbnails in each column, for a total of 5*5 or 25 thumbnails without scrolling. That is, in this example, frame 125 may display 25 thumbnails without the use of a scroll bar. In FIG. 2, Pane A may have a height of 240 pixels and a width of 250 pixels. Region 1 of pane B may have dimensions of 240×550, and using substantially similar thumbnails dimensions, may display (240÷120) 2 rows of (550÷110) 5 columns of thumbnails or 10 thumbnails. Region 2 of pane B may have dimensions of 360×800 pixels and may display (360÷120) 3 rows of (800÷110) 7 thumbnails, or 21 thumbnails. Pane B 225 as shown in FIG. 2 may display (10+21) or, 31 thumbnails without scrolling. That is, pane 225 may display an additional 6 thumbnails for a total of 31 thumbnails without scrolling. Consequently, the additional space obtained from sizing pane A appropriately enabled pane 225 to display additional thumbnails.

As the dimensions of the media representations decrease, the number of additional representations that may be displayed using auto adjustable panes increases. For example, if the thumbnail has smaller dimensions of 60×60, frame 125 in FIG. 1 may fit (550÷60) 9 rows of (600÷60) 10 thumbnails or 90 thumbnails. Region 1 of pane B may display (240÷60) or 4 rows of (550÷60) 9 thumbnails or (9*4) or 36 thumbnails. Region 2 of pane B may display (360÷60) 6 rows of (800÷60) 13 thumbnails or (13*6) or 78 thumbnails. For a total of (78+36) 114 thumbnails, or 24 more thumbnails using auto adjustable panes.

Figure 6:
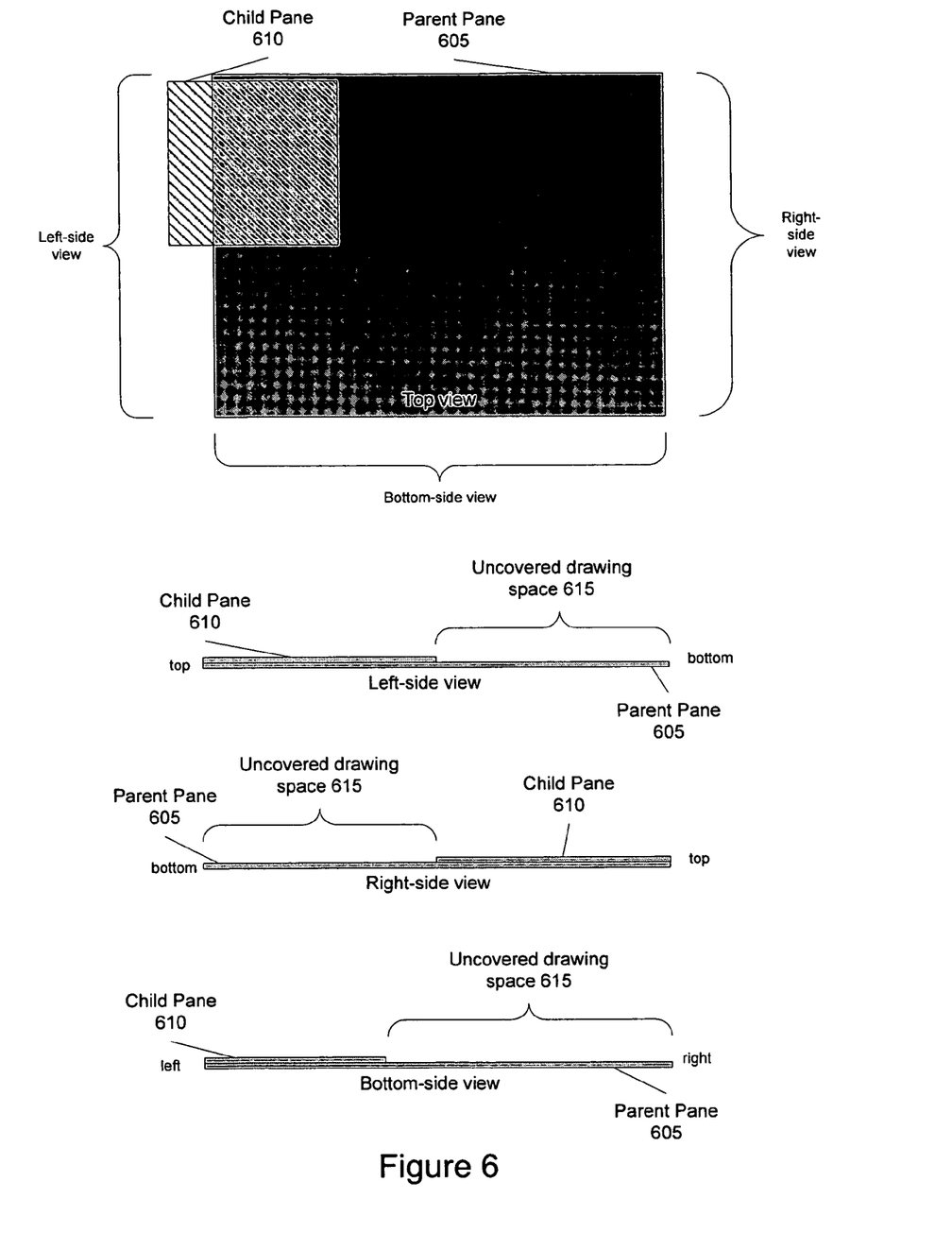
FIG. 6 illustrates a plurality of views of an exemplary display window including an adjustable size pane and a window size pane.

FIG. 6 illustrates a plurality of views of an exemplary display window including an adjustable size pane and a window size pane. Some embodiments for sizing panes may create a pane the size of the display window and may create another pane of adjustable size. The pane the size of the display window may be referred to as parent pane 605. The adjustable size pane may be referred to as child pane 610. Child pane 610 may be positioned on top of, or covering a portion of, parent pane 605. In other words, parent pane 605 may have a portion of the pane that may be covered by child pane 610 and another portion that remains uncovered. The covered portion of parent pane 605 may not be used to display content as child pane 610 may be concealing it from view. The uncovered portion, or portion not under the child pane, may be used for display and may be referred to as drawing space, or pane drawing space. The top view in FIG. 6 shows child pane 610 being positioned slightly askew (i.e., offset) from parent pane 605. The offset is provided for illustration purposes, child pane 610 may sit substantially on top of parent pane 605. The left-side view illustrates parent pane 605 underneath child pane 610. Child pane 610 is positioned on top of, or covering, the upper portion of the left-side view of parent pane 605 showing uncovered drawing space 615 in the bottom portion of the left-side view of parent pane 605. The right-side view illustrates parent pane 605 underneath child pane 610. Child pane 610 is positioned on top of or covering the upper portion of the right-side view of parent pane 605 showing uncovered drawing space 615 in the bottom portion of the right-side view of parent pane 605. The bottom-side illustrates parent pane 605 underneath child pane 610. Child pane 610 is positioned on top of or covering the left hand portion of the bottom-side view of parent pane 605 showing uncovered drawing space 615 in the right hand portion of the bottom-side view of parent pane 605.

Figure 7:
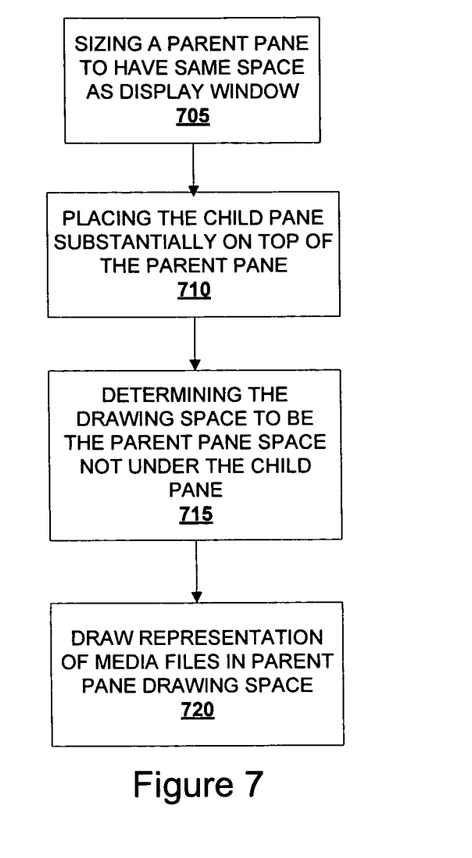
FIG. 7 illustrates an exemplary process for determining drawing space for the window size pane.

FIG. 7 illustrates an exemplary process for determining the drawing space for the window size pane. In process action 705, the parent pane is sized to have substantially similar space as the display window. In process action 710 the child pane. 610 is placed on top of parent pane 605. Parent pane 605 may track the location and dimension information for child pane 610. This information is used to calculate the space used by child pane 610. The dimension information may include an upper-left corner and a lower-right corner. The location information may determine the position of the upper right corner of the child pane. For example, if child pane 610 is 300 pixels in height by 300 pixels in width with the location information being the upper right-side corner of the display window, the area consumed by the child pane may be a square of 300×300 pixels with the upper right corner of the child pane located in the upper right corner of the display window. In process action 715, the drawing space of the parent pane is determined to be that space which is not covered by, or not under, the child pane. That is, even though parent pane 605 has substantially similar space as the display window, the parent pane 605 drawing space may be initially implemented using the uncovered space, i.e., the space not covered by child pane 610. In other words, the uncovered space may be allocated to, or assigned to, the drawing space of parent pane 605. In some embodiments, allocating drawing space may be referred to as allotting, assigning, transferring, conveying, or designating a portion of a pane's space to be available for displaying elements. In other embodiments, allocating may be described differently. Process action 720 may draw representations of media files in the available drawing space of parent pane 605.

The process of determining drawing space may change from sizing to sizing. In some embodiments, a first child pane sizing may be larger than a second sizing. That is, in a first sizing instance, a child pane may be determined to be size 2X, and the parent pane may be allocated a drawing space of window space minus 2X. In a second sizing instance, a child pane may be determined to be size X, that is, the child pane in the second sizing instance is half the size of the child pane in the first sizing instance. The difference in child pane sizes of X may be reallocated or reassigned, from the child pane to the parent pane drawing space. In some embodiments, reallocating may refer to using space from the child pane drawing space to enhance or enlarge the parent pane drawing space. In other embodiments; reallocating may be described differently. The resulting parent pane drawing space in the second sizing instance may be window size minus X. In some embodiments a first child pane sizing may be smaller than a second sizing. That is, in a first sizing instance, a child pane may be determined to have a size of X, and the parent pane may be allocated a drawing space of window space minus X. In a second sizing, the child pane may be determined to be 2X, twice as large as the first sizing. The difference in pane sizing of X may be reallocated from the parent pane drawing space to the child pane. The resulting parent pane drawing space in the second sizing instance may be window size minus 2X. The above-described examples may vary in design, description, and implementation and are not limited to those described above.

Figure 8:
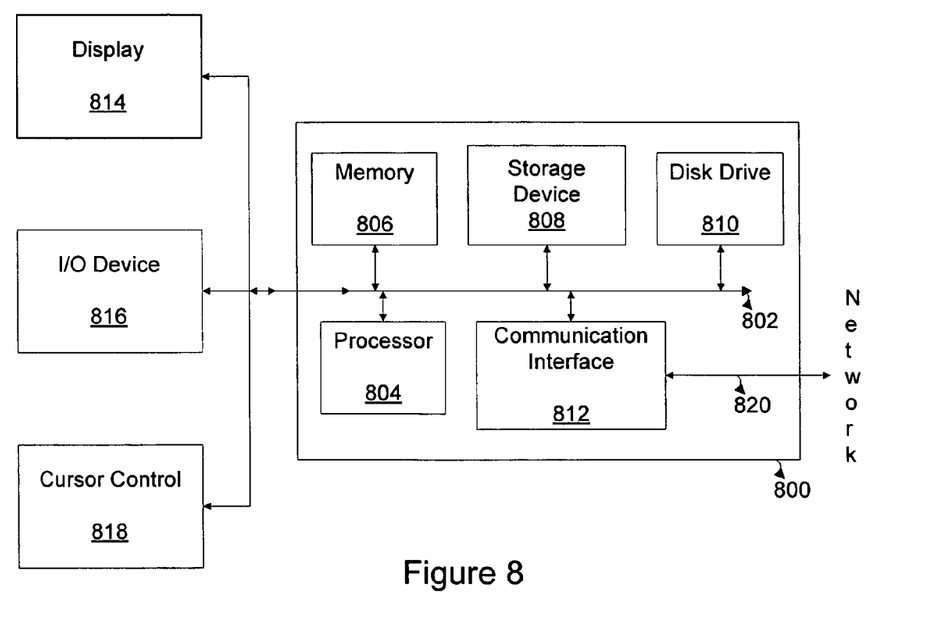
FIG. 8 illustrates an exemplary system in which auto adjustable pane view may occur.

FIG. 8 illustrates an exemplary system in which auto adjustable pane view may occur, in accordance with an embodiment. In some embodiments, computer system 800 may be used to implement computer programs, applications, methods, or other software to perform the above-described techniques for fabricating storage systems such as those described above. Computer system 800 includes a bus 802 or other communication mechanism for communicating information, which interconnects subsystems and devices, such as processor 804, system memory 806 (e.g., RAM), storage device 808 (e.g., ROM), disk drive 810 (e.g., magnetic or optical), communication interface 812 (e.g., modem or Ethernet card), display 814 (e.g., CRT or LCD), input device 816 (e.g., keyboard), and cursor control 818 (e.g., mouse or trackball).

According to some embodiments of the invention, computer system 800 performs specific operations by processor 804 executing one or more sequences of one or more instructions stored in system memory 806. Such instructions may be read into system memory 806 from another computer readable medium, such as static storage device 808 or disk drive 810. In some embodiments, hard-wired circuitry may be used in place of or in combination with software instructions to implement the invention.

The term "computer readable medium" refers to any medium that participates in providing instructions to processor 804 for execution. Such a medium may take many forms, including but not limited to, non-volatile media, volatile media, and transmission media. Non-volatile media includes, for example, optical or magnetic disks, such as disk drive 810. Volatile media includes dynamic memory, such as system memory 806. Transmission media includes coaxial cables, copper wire, and fiber optics, including wires that comprise bus 802. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some embodiments of the invention, execution of the sequences of instructions to practice the invention is performed by a single computer system 800. According to some embodiments of the invention, two or more computer systems 800 coupled by communication link 820 (e.g., LAN, PSTN, or wireless network) may perform the sequence of instructions to practice the invention in coordination with one another. Computer system 800 may transmit and receive messages, data, and instructions, including program, i.e., application code, through communication link 820 and communication interface 812. Received program code may be executed by processor 804 as it is received, and/or stored in disk drive 810, or other non-volatile storage for later execution.

Although the foregoing examples have been described in some detail for purposes of clarity of understanding, the invention is not limited to the details provided. There are many alternative ways of implementing the invention. The disclosed examples are illustrative and not restrictive.

What is claimed:

1. A computer-implemented method, comprising:
   sizing a first pane of a display space to display a plurality of items, wherein said sizing a first pane comprises setting height of the first pane dependent on height of the plurality of items and setting width of the first pane dependent on width of the plurality of items, wherein, subsequent to said sizing, the height of the first pane is less than height of the display space and the width of the first pane is less than the width of the display space;
   setting a location of the first pane in the display space, wherein a portion of the display space not covered by the first pane is unused drawing space;
   allocating the unused drawing space to a second pane of the display space, wherein:
   the second pane comprises a first region and a second region;
   sizing the second pane to have substantially similar space as the display space;
   placing the first pane substantially on top of the second pane; and
   determining the unused drawing space to be the second pane space not under the first pane;
   displaying one or more rows each including one or more media file representations in the first region of the second pane;

displaying one or more rows each including two or more media file representations in the second region of the second pane; and adjusting a vertical spacing between a last row in the first region and a first row in the second region so that the vertical spacing between the last row and the first row corresponds to the vertical spacing between other rows in the first region and the second region;

wherein the media file representations displayed in the second pane correspond to one or more of the plurality of items displayed in the first pane.

2. The method of claim 1, wherein said sizing the first pane further comprises:

determining the height of the plurality of items by multiplying item height by a number of the plurality of items.

3. The method of claim 1, wherein said sizing the first pane further comprises setting a spacing parameter to increase the height of the first pane.

4. The method of claim 1, wherein said sizing the first pane further comprises setting a spacing parameter to increase the width of the first pane.

5. The method of claim 1, wherein said sizing the first pane further comprises setting an upper-left corner of the first pane and a lower-right corner of the first pane.

6. The method of claim 1, wherein the location of the first pane in the display space comprises a set of coordinates.

7. The method of claim 1 wherein the second pane tracks the location and size of the first pane.

8. The method of claim 1, wherein the display space includes a plurality of first panes.

\* \* \* \* \*